T. W. HYDE.

Power-Capstan.

No. 8,842. Reissued Aug. 12, 1879.

*Attest:*

R. F. Barnes.

L. W. Sully

*Inventor:*

Thomas W. Hyde, by Ellis Spear

Atty

N. PETERS, PHOTO-LITHOGRAPHER, WASHINGTON, D. C.

UNITED STATES PATENT OFFICE.

THOMAS W. HYDE, OF BATH, MAINE.

IMPROVEMENT IN POWER-CAPSTANS.

Specification forming part of Letters Patent No. 187,282, dated February 13, 1877; Reissue No. 8,842, dated August 12, 1879; application filed June 30, 1879.

*To all whom it may concern:*

Be it known that I, THOMAS W. HYDE, of Bath, in the county of Sagadahoc and State of Maine, have invented a new and useful Improvement in Power-Capstans; and I hereby declare that the following is a full, clear, and exact description of the same.

My invention relates to that class of capstans in which the motion of the head in one direction imparts a direct motion to the barrel, and the motion of the head in the opposite direction moves the said barrel through intermediate gears, by which the power imparted to the head is multiplied in the barrel with a corresponding diminution of speed.

The object of the invention is to simplify the working parts, to render all the operations of the machinery within the capstan automatic for the changes of direction in the motion, and to make the working parts strong and durable and compact.

Figure 1:
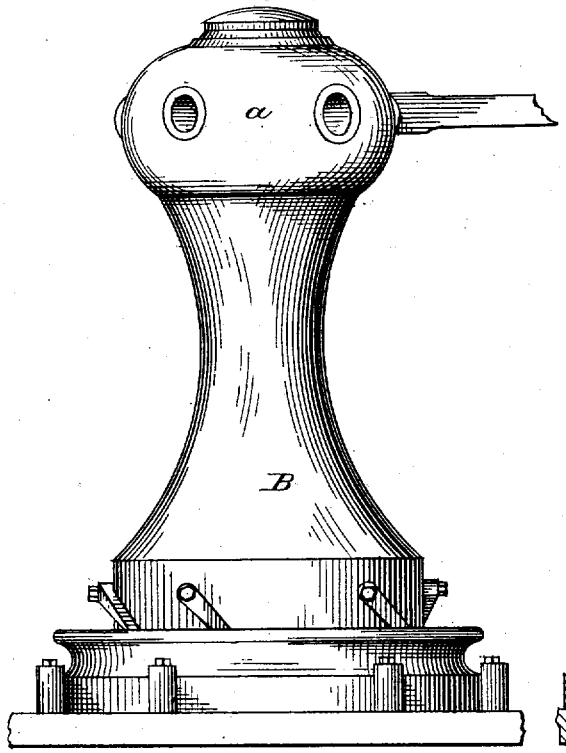
Figure 2:
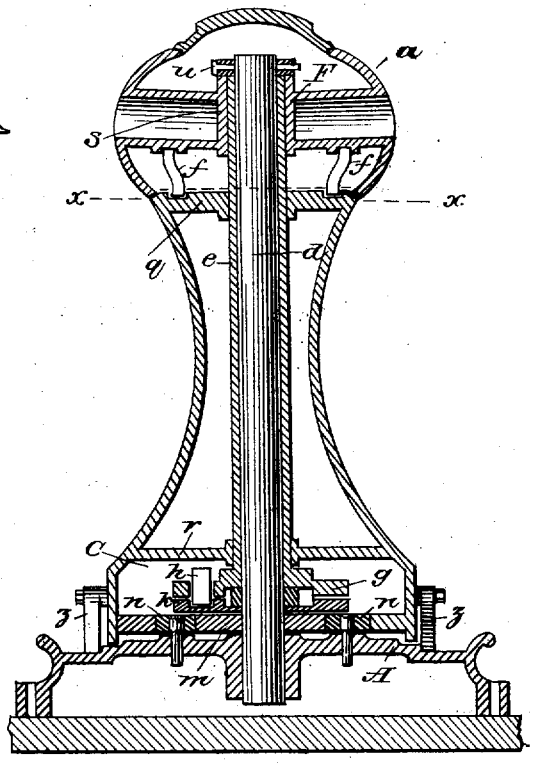
Figure 6:
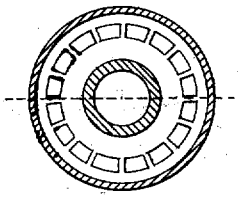
Figure 5:
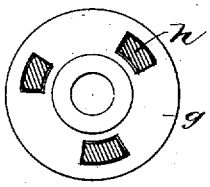
Figure 4:
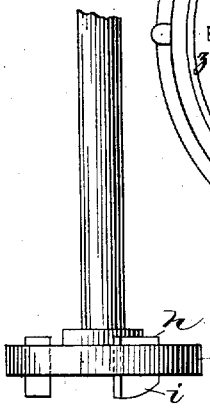
Figure 3:
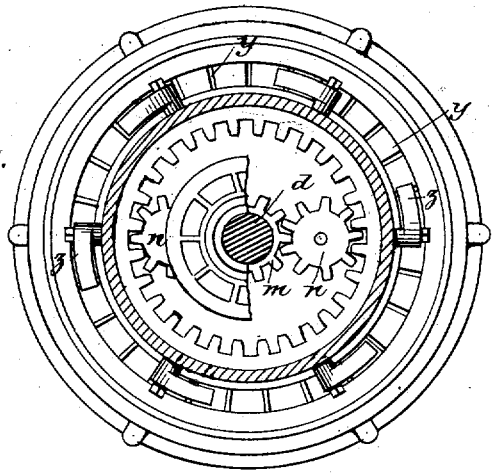

In the drawings hereunto attached, representing the construction of my improved capstan, Figure 1 is a side elevation. Fig. 2 is a vertical transverse section. Fig. 3 is a plan of the base, showing the arrangement of the gears. Fig. 4 is a side view of the sleeve, with its bottom and keys. Fig. 5 is a top plan of the bottom part of Fig. 4. Fig. 6 is a cross-section taken on the line *x x* of Fig. 2.

The base of my improved capstan is shown clearly in Figs. 1 and 2, and is indicated at A. It may be cast in one piece, of suitable shape for attachment to the deck, with a center perforation for the shaft, with bosses to receive the pinions, and with ratchet-teeth *y y* for the pawls of the barrel.

The barrel is represented at B, and it is cast in the form shown clearly in Figs. 1 and 2, with a head, *q*, a diaphragm, *r*, and a lower chamber, C, opened below. The head of the capstan is of ordinary shape, fitted to the barrel, and is provided with a central sleeve, *s*, and the ordinary holes for the levers. This central sleeve is fixed rigidly to a sleeve, *e*, which is then caused to rotate with the head *a*. The vertical shaft *d* extends through this sleeve and through the center of the base A, being suspended from above by the pin *u*. The sleeve *e* passes snugly through the opening in the head *q* of the barrel, through the diaphragm *r*, and terminates a little below the surface of the said diaphragm; and to its lower end is fixed rigidly a disk, *g*, which carries sliding pawls *h* in suitable holes made through the said disk. These pawls and the disk *g*, as it is attached to the sleeve *e*, are shown clearly in Fig. 4. The pawls are made with inclined faces, as shown at *i* of the figure last specified, and they are fitted to ratchet-teeth in the disk *k*, so that when the disk *g* revolves in one direction the pawls *h* will ride over the teeth without imparting any motion to disk *k*, but in the opposite direction will catch in the said teeth and cause the disk *k* to revolve with the disk *g* and with the sleeve *e*.

The gear *m*, immediately below the disk *k*, as represented in Fig. 2, is connected to the said disk, so as to revolve therewith. This gear *m* meshes into pinions *n n*, pivoted upon the bosses of the base, which pinions, in their turn, gear into an annular rack fixed to the inner surface of the lower part of the barrel. This forms one connection between the head and the barrel. The other connection is formed between the head and the barrel by means of the pawls *f f*, which are pivoted to the head, as shown in Fig. 2, and which so gear into an annular ratchet in the head *q* of the barrel B that they will move freely over the barrel in one direction, but will carry the barrel with the head *a* in the other direction. When the head of the capstan is moved in a direction to cause the pawls *f* to gear into the teeth in the head of the barrel, and the barrel is thus carried directly with the head of the capstan, obviously the power is simply that which is gained by the length of the levers, and the motion is simple and uniform with the head. There is no loss of motion and no gain in power; but when the head of the capstan is moved in the opposite direction the pawls *f f* ride over the teeth without connection; but as the sleeve *e* is fixed to the head it is carried therewith. Its corresponding revolution carries with it the disk *g*. The revolution in this direction carries the pawls *h* with their vertical faces forward, which come in contact, when thus carried, with the vertical faces of the teeth in the disk *k*. This disk is thereby moved with the disk *g*, which directly moves the gear *m*, the intermediate gears, and the barrel B, as heretofore explained. The pawls *z z*, Fig. 2, hold the barrel at any desired point in its revolution.

It will be observed that all the gearing necessary for the direct or reversed motion of the barrel is included in the chamber in the base of the said barrel. The parts are all simple in construction, and all, whether the direct or reversed motion is imparted to the head, act automatically to communicate the proper motion to the barrel.

Having thus described my invention, what I claim, and desire to secure by Letters Patent, is—

1. In a capstan of the described class, the combination of the barrel B, of the head *a*, connected therewith by pawls, of the shaft *d*, the sleeve *e*, and the disk *g*, the said disk *g* acting through pawls, and the disk *k* upon the intermediate gears *m* and *n*, as and for the purposes set forth.

2. In combination with the annular rack and with the pinion *m*, impelled directly by the motion of the shaft *e*, the gears *n*, pivoted upon the bosses of the base-plate, as and for the purpose set forth.

THOS. W. HYDE.

In presence of—
GEO. H. HODGKINS,
J. B. JAMESON.